Nov. 26, 1968  C. W. MARYNOWSKI  3,412,898
POWDER FEEDER
Filed Feb. 7, 1966
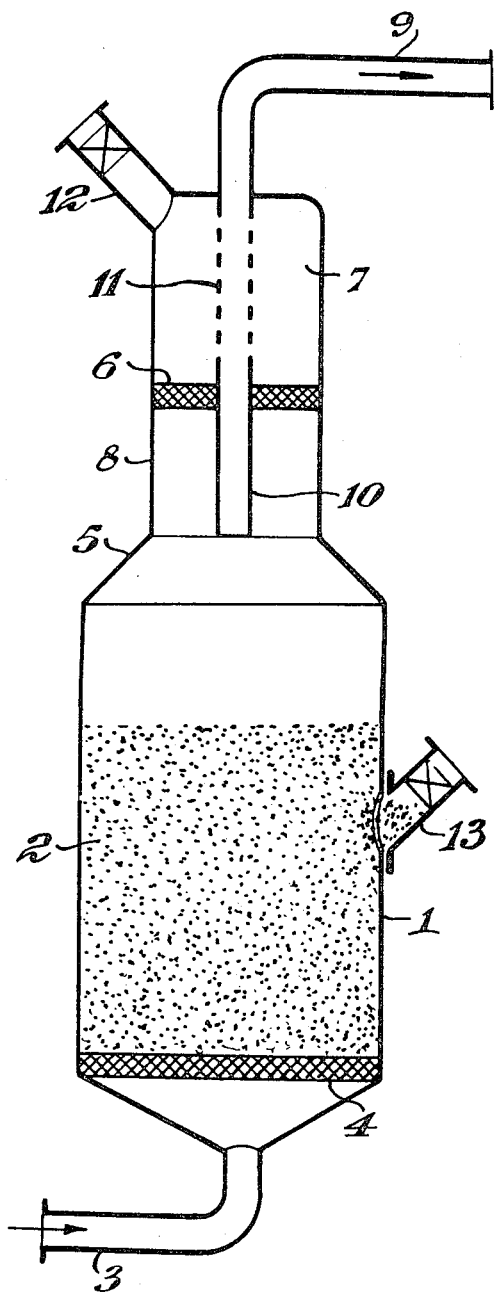

United States Patent Office 3,412,898
Patented Nov. 26, 1968

3,412,898
POWDER FEEDER
Chester Waldemar Marynowski, Mountain View, Calif., assignor to British Titan Products Company Limited, Billingham, England, a corporation of the United Kingdom
Filed Feb. 7, 1966, Ser. No. 525,670
11 Claims. (Cl. 222—1)

ABSTRACT OF THE DISCLOSURE

Apparatus for producing a lean suspension of solids has a chamber for supporting a bed of solids therein on an air permeable deck. Air passed through deck deagglomerates particles thereon and entrains solids to form a suspension. Concentric conduits divide the suspension into two portions. Filter in annulus removes particles from one portion and at least part of gaseous effluent is combined with remaining portion and discharged as desired suspension.

---

The present invention relates to a process and apparatus for the production of a suspension of particles in a gas.

There are various industrial processes in which it is desired to make use of a suspension of particles in a gas. In some processes, it is most desirable that the suspension should be a lean one. By a lean suspension is meant a suspension in which the particles are not agglomerated to any significant extent, but are maintained clearly separated from one another and sufficiently far apart for the chance of a significant number of particles meeting and adhering to one another to be quite small.

As an example of a process in which a lean suspension is particularly desirable, there may be mentioned the production of fine particle silicon carbide by reacting a vaporised silicon oxide with a carbonaceous substance in a radio-frequency induced plasma, as described in co-pending British patent application No. 6,381/65. Other process which involve the vaporisation of a solid in a plasma also desirably make use of a lean suspension of the solid for feeding into the plasma, so that the solid should be rapidly and completely vaporised when it enters the plasma. Such a process is described in co-pending British patent application No. 20,000/64.

Various methods of producing suspensions of particles in a gas are known but the production of lean suspensions of constant composition remains difficult. This is particularly difficult when it is desired to provide a lean suspension of constant composition at a constant rate.

This invention makes possible the provision of a process and apparatus for the production of lean suspensions, e.g. those of constant composition fed at a constant rate.

The present invention provides a process for producing a lean suspension of particles in a gas, comprising feeding the gas into a chamber containing a mass of the particles with a velocity sufficient to cause turbulence so as to break down agglomerates of the particles and entrain a fraction of the particles as a suspension in the gas, removing a first portion of the suspension from the chamber through a take-off duct, filtering particles from a second portion of the suspension, and feeding part or all of the gas thus filtered into the take-off duct.

The gas is preferably fed into the bottom of the mass of particles, and it may be fed in such a way as to produce a fluidised bed of the particles. If the particles contain a large proportion of agglomerates, the formation of a fluidised bed may be particularly helpful as it may increase the degree of turbulence, thus facilitating the breaking down of the agglomerates into their constituent particles before entrainment occurs.

If here is a fluidised bed, the degree of turbulence can be still further increased by a reduction in the horizontal diameter of the chamber, the reduction being located at or above the top of the fluidised bed, so that the upper part of the chamber is narrower than the lower. This reduction causes an increase in the velocity of the gas as it rises past the reduction and this both increases turbulence and facilitates the entrainment of particles from the top of the fluidised bed. Particles already entrained are swept along by the increased velocity of the gas, so that the chances of an entrained particle falling back into the bed from the space above it are diminished.

Various methods can be used to make the suspension in the chamber yield the first portion thereof (removed as such through the take-off duct) and the second portion (which is filtered, the filtered gas then being passed into the take-off duct). For example, the take-off pipe may lead directly from the zone of the chamber containing the suspension, while another duct may lead from this zone through a by-pass to the take-off duct, the other duct having a filter fitted across its cross section so as to filter off some or all of the suspended particles which would otherwise pass through the by-pass. The filter could be located in the wall or the roof of the chamber where the other duct left the chamber.

It is preferred, however, to place the filter across the cross section of the chamber itself, near the roof thereof. The take-off duct extends from the roof of the chamber as far down as, or further down than, the filter, the mouth of the take-off duct being fitted through a corresponding hole in the filter. The portion of the take-off duct between the roof of the chamber and the filter is provided with perforations which allow the filtered gas to pass into the take-off duct. In case the volume of filtered gas is too great for it to be desirable to introduce all the filtered gas into the take-off duct, a bleed-off duct may be fitted to part of the chamber above the filter so that a portion of the filtered gas can be bled off from the system.

The invention accordingly also provides apparatus for producing a lean suspension of particles in a gas, comprising a chamber, means for feeding gas into the chamber so as to cause turbulent motion of a mass of particles which may be contained in the chamber and entrainment of particles from the mass so as to form a suspension of the entrained particles in the gas, a take-off duct to remove a first portion of the suspension from the chamber, means to filter particles from a second portion of the suspension and means to feed part or all of the gas thus filtered into the take-off duct.

Preferably, the chamber is divided into a lower portion (containing the mass of particles) and an upper portion by a gas permeable partition forming the means to filter particles from the second portion of the suspension, the take-off duct extending downwardly into the chamber at least as far as the gas permeable partition and being fitted through a corresponding hole in the gas permeable partition, the portion of the take-off duct within the chamber but above the gas permeable partition being perforated so as to form the means to feed part or all of the filtered gas into the take-off duct.

The mass of particles is preferably in the form of a fluidised bed and it is also preferred that there be a reduction in the horizontal diameter of the chamber at or above the level of the surface of the fluidised bed, so that the upper part of the chamber is narrower than the lower part.

The invention is illustrated by the drawing accompanying the provisional specification, which shows diagrammatically an apparatus for producing a lean suspension of particles in a gas.

The apparatus comprises a chamber 1 containing a mass of solid particles 2 fluidisable by a gas introduced through duct 3 and gas-permeable base plate 4. The diameter of the chamber 1 is reduced at 5, just above the surface of the fluidised mass 2. A gas permeable partition 6 divides the chamber into an upper portion 7 and a lower portion 8. A take-off duct 9 protrudes through a corresponding hole in the gas permeable partition 6 as far as mouth 10. The portion of the take-off duct 9 within the upper portion 7 of the chamber 1 has perforations 11 formed as milled slots. A port 13 allows the mass 2 to be replenished. A bleed-off pipe 12 leads from the portion 7.

In the operation of the process, gas is introduced through the duct 3 and the gas-permeable base plate 4 so as to fluidise the mass of particles 2. Gas rising above the level 5 entrains some of the fluidised particles. A first portion of the suspension thus produced passes through mouth 10 into take-off pipe 9. The remainder of the suspension is filtered by gas permeable partition 6 so that the particles it contains remain in lower portion 8 and tend to fall back into the mass 2, while the filtered gas passes up through gas permeable partition 6 into upper portion 7, and thence, through perforations 11, into take-off duct 9. A proportion of the filtered gas may, if desired, be bled off through bleed-off pipe 12, so as to control the degree of leanness of the suspension in take-off duct 9. Fresh particles are introduced through port 13 either continuously or from time to time so as to maintain the height of the fluidised mass by replacing particles which have been entrained away through take-off duct 9.

The dimensions of the apparatus are determined by the required rate of solids feed. For any given vessel diameter the rate of solids take off is further determined by the ratio of the diameter of the take-off duct to the diameter of the chamber at the level of the mouth of the take-off duct.

A particularly useful feature of the invention is that it may largely or completely break down the loose agglomerates of particles which will often form a large proportion of the starting material. It is usually found that very fine particles which are to be used industrially are in a state of more or less loose agglomeration, and the ability of the present process to break down much of such agglomeration by reason of the turbulent motion of the mass of particles can be extremely useful in cases where it is required to use a lean suspension of fine particles rather than of agglomerates. One such case is the process of No. 6,381/65 mentioned above.

The breaking down of agglomerates in the chamber and the prevention of objectionable agglomeration in the take-off duct, can be facilitated by the use of deflocculant. A good deflocculant for the present purpose is oleic acid, which may suitably be in the form of an aqueous dispersion. An amount of oleic acid which is about 0.1%, by weight of the particles, has been found very effective. It is preferred to apply the deflocculant to the particles before they are introduced into the chamber.

The size of the particles used in the present process may vary widely. While the benefits conferred by the invention are most significant with very small particle sizes, e.g. sizes up to about 210 microns, such as are preferred in the process of No. 6,381/65, it is possible to use larger particles if lean suspensions of such particles are required. If a fluidised bed is to be used in the chamber, then of course the particles must not be to large to be fluidisable. It is envisaged that particle sizes up to about 2000 microns might be used.

An advantage of the present process is that particles having a fairly wide size distribution can be used without any significant build-up of the coarser particles in the bed.

In an actual experiment using the process of the invention, the apparatus shown in the drawing was used. The particles introduced into the chamber were silica sand particles of diameters between 44 and 210 microns. The gas used was oxygen.

The lean suspension of silica in oxygen produced by the process was fed into a plasma reactor, the plasma being maintained by a coil consuming 8.5 kilowatts. The coil had a reverse turn above the plasma zone and another below such zone, so as to confine the plasma magnetically and stabilize it during the passage of solids into it. The silica was promptly and completely vaporized by the plasma. The vaporized silica was condensed and collected. The product was found to be silica fume of average particle size 0.01 micron, and had a specific surface of about 200 square meters per gram.

What is claimed is:
1. A process for producing a lean suspension of particles in a gas from a mass of said particles comprising the steps:
   (1) feeding gas into said mass of particles with a velocity sufficient to cause turbulence of the particles and to entrain a substantial portion of said particles as a suspension in said gas;
   (2) separating first and second portions of said suspension;
   (3) filtering suspended particles from said second portion of said suspension; and
   (4) mixing at least part of the gaseous effluent from step (3) with said first portion of suspension separated in step (2).

2. A process in accordance with claim 1 wherein gas is fed in step (1) into the bottom of the mass of particles.

3. A process in accordance with claim 1 wherein gas is fed in step (1) into the bottom of the mass of particles with sufficient velocity and in a manner to produce a fluidized bed of the particles.

4. A process in accordance with claim 3 wherein the velocity above said fluidized bed of the gaseous suspension produced in step (1) is increased substantially prior to step (2).

5. A process for producing a lean suspension of particles in a gas which comprises the steps:
   (1) providing a mass of said particles in which the maximum particle size is 2000 microns;
   (2) feeding gas into the bottom of said mass of particles with sufficient velocity and in a manner to cause turbulence of the particles and to produce a fluidized bed of the particles;
   (3) entraining a substantial portion of said particles as a suspension in said gas;
   (4) separating first and second portions of said suspension;
   (5) filtering said second portion of said suspension to provide a gaseous effluent and filtered particles;
   (6) recycling said filtered particles to said fluidized bed; and
   (7) mixing at least part of said gaseous effluent with said first portion of said suspension to provide said lean suspension of particles in gas.

6. A process in accordance with claim 5 wherein the velocity of the gaseous suspension above said fluidized bed is increased substantially prior to step (4).

7. A process in accordance with claim 5 wherein the maximum particle size in said mass of particles is 210 microns.

8. Apparatus for producing a lean suspension of particles in a gas comprising in combination:
   (1) a chamber;
   (2) gas feeding means adapted to introduce gas into a mass of particles contained in said chamber (1) in a manner to effect turbulent motion of particles in said mass and to entrain particles from said mass in a gaseous suspension;
   (3) means for separating a portion of said suspension and removing said portion from said chamber (1);
   (4) filtering means for separating entrained particles from the balance of said suspension; and
   (5) means for intermixing at least part of the gaseous effluent from filtering means (4) with the portion of suspension separated by separation means (3).

9. An aparatus in accordance with claim 8 wherein said chamber (1) is divided into an upper zone and a lower zone by said filtering means (4), said filtering means (4) comprising a gas permeable partition provided with an aperture communicating between said upper and lower zones and wherein said separating means (3) comprises a conduit extending into said chamber through said upper zone and extending downwardly at least as far as said filtering means (4), said conduit adapted to receive a portion of gaseous suspension from said lower zone, the portion of said conduit in said upper zone functioning as intermixing means (5) and provided with apertures to receive gaseous effluent from filtering means (4).

10. An apparatus in accordance with claim 8 wherein said gas feeding means (2) is adapted to feed gas into said contained mass of particle in a manner to form a fluidized bed of the particle.

11. An apparatus in accordance with claim 10 wherein there is provided a velocity-increasing constriction in said lower zone of chamber (1), said constriction positioned below said separating means (3) and said filtering means (4) and above said fluidized bed of particles, said constriction adapted to increase the velocity of gaseous suspension flowing from said fluidized bed upward to said separating means (3) and said filtering means (4).

References Cited

UNITED STATES PATENTS

| | | | |
|---|---|---|---|
| 2,815,858 | 12/1957 | Rich | 209—138 |
| 3,134,513 | 5/1964 | Ashman | 222—193 |

OTHER REFERENCES

Enzinger: German application Ser. No. 10500, printed July 12, 1956, (KI 12d 14), 3 pages spec.; 1 sheet dwg. Class 222 Sub. 193.

FRANK W. LUTTER, *Primary Examiner.*